(12) United States Patent
Witzman (10) Patent No.: US 7,881,933 B2
(45) Date of Patent: Feb. 1, 2011

(54) AGE DETERMINATION USING SPEECH

(75) Inventor: Kevin R. Witzman, Monument, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 984 days.

(21) Appl. No.: 11/690,242

(22) Filed: Mar. 23, 2007

(65) Prior Publication Data

US 2008/0235019 A1  Sep. 25, 2008

(51) Int. Cl.
*G10L 17/00* (2006.01)
(52) U.S. Cl. .................. 704/250; 704/246; 704/270
(58) Field of Classification Search .......... 704/246, 704/250, 251, 255, 270, 270.1, 273, 231
See application file for complete search history.

(56) References Cited

U.S. PATENT DOCUMENTS

| | | | |
|---|---|---|---|
| 6,253,181 B1 * | 6/2001 | Junqua | 704/255 |
| 6,985,859 B2 * | 1/2006 | Morin | 704/240 |
| 7,200,635 B2 * | 4/2007 | Yashchin et al. | 709/206 |
| 7,318,029 B2 * | 1/2008 | Coyle et al. | 704/231 |
| 7,340,398 B2 * | 3/2008 | Lin | 704/270 |
| 2004/0215453 A1 * | 10/2004 | Orbach | 704/231 |
| 2007/0033017 A1 * | 2/2007 | Nair et al. | 704/219 |
| 2007/0050636 A1 * | 3/2007 | Menczel et al. | 713/186 |
| 2007/0198261 A1 * | 8/2007 | Chen | 704/240 |
| 2007/0293198 A1 * | 12/2007 | Sanmugasuntharam et al. | 455/414.1 |

* cited by examiner

*Primary Examiner*—Huyen X. Vo (57) ABSTRACT

A device may include logic configured to receive voice data from a user, identify a result from the voice data, calculate a confidence score associated with the result, and determine a likely age range associated with the user based on the confidence score.

24 Claims, 6 Drawing Sheets

FIG. 5

AGE DETERMINATION USING SPEECH

BACKGROUND INFORMATION

Restricting individuals' access to goods, services, or content based on age has long been considered a useful method for ensuring that minors or adults below a certain age are not provided with access to inappropriate goods, services, or content. For example, individuals are typically required to provide documented proof of age in order to purchase alcohol, or cigarettes, or to access establishments such as bars, nightclubs, and casinos.

The conventional process of displaying photographic proof, however, is not available when providing remote access to the restricted goods, services, or content. For example, social networking web sites such as MySpace.com allow only individuals over the age of 13 to register with the site. Similarly, telephony services, such as 1-900 telephone services typically require that users be over the age of 18. Such services typically require that a potential user affirmatively indicate that they meet or exceed the required age limit. Unfortunately, such methods do not protect against false or mistaken indications of age.

DETAILED DESCRIPTION OF PREFERRED EMBODIMENTS

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations may include an engine and/or server configured to obtain speech data from an individual via a network, such as a public switched telephone network (PSTN) or a Voice over the Internet Protocol (VoIP) or other data network. The server may perform speech recognition on the received speech data and may generate a confidence value associated with the recognized speech. The server may determine a likely age range based on the generated confidence value.

Implementations described herein facilitate remote and/or automated age verification or determination. The resulting determination may be used to provide access to services, facilities, or applications that are age-restricted or age appropriate.

Figure 1:
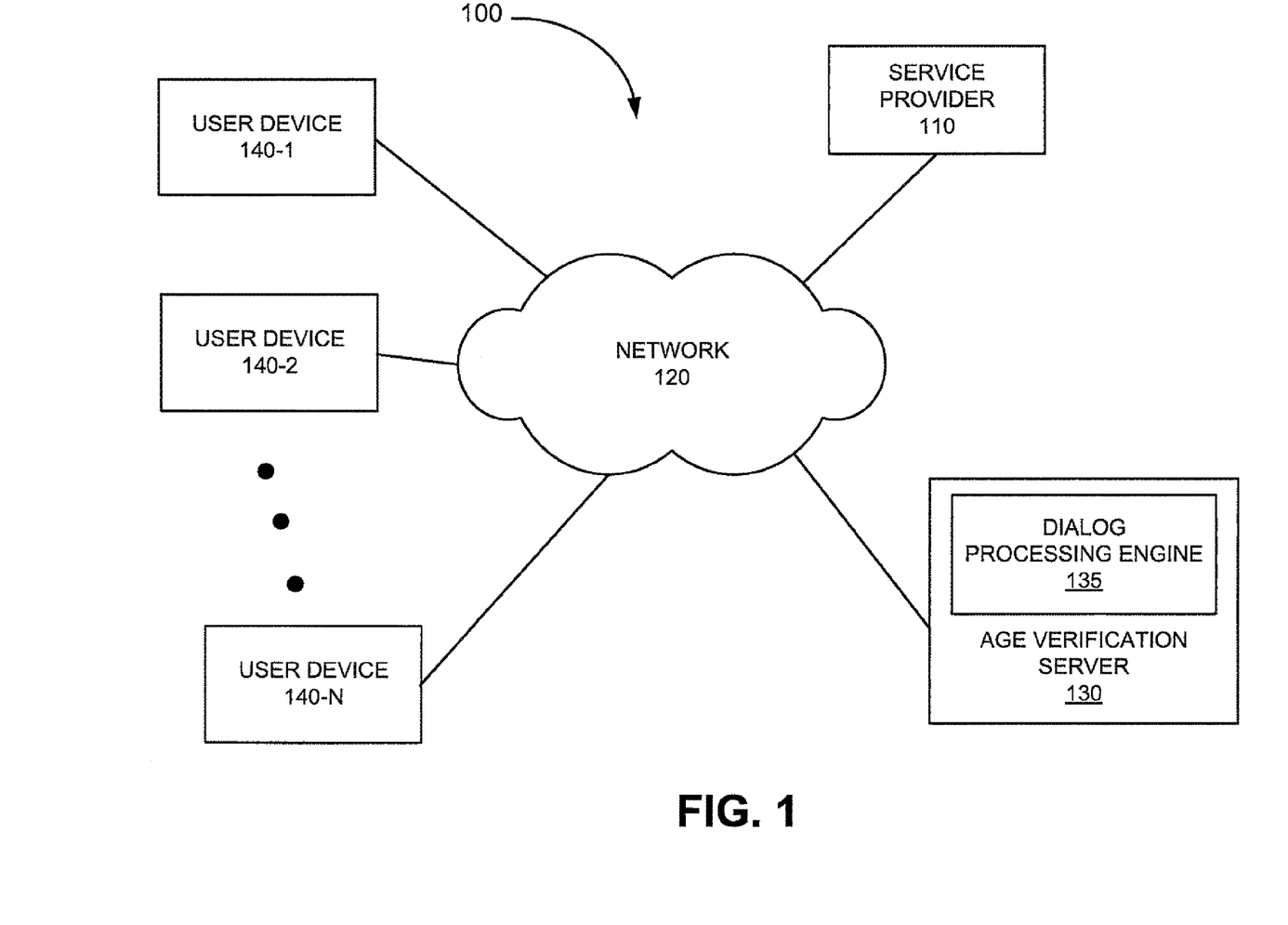
FIG. 1 is a block diagram illustrating an exemplary communications system in which systems and methods consistent with the exemplary embodiments described herein may be implemented.

FIG. 1 is a block diagram illustrating an exemplary communications system 100 in which systems and methods consistent with the exemplary embodiments described herein may be implemented. Communications system 100 may include a service provider 110, a network 120, an age verification server 130, and a number of user devices 140-1 through 140-N (collectively referred to as "user devices 140").

Service provider 110 may include any device or system configured to request an age verification operation from age verification server 130. For example, service provider 110 may include a web server associated with an age-restricted web site, such as MySpace.com, etc. In this implementation, a user device 140, such as a personal computer or other network-accessing device, may be configured to connect to service provider 110 via network 120 and request access to or registration with content hosted on service provider 110. In response, service provider 110 may transmit an age verification request to age verification server 130 based on the received access request.

In an alternative implementation, service provider 110 may include an interactive voice response (IVR) system associated with an age-restricted telephone service. In yet another implementation, service provider 110 may include a laptop or desktop computer, web enabled cellular telephone, personal digital assistant (PDA), and/or plain old telephone system (POTS) device associated with a service provider's point of service (POS). For example, service provider 110 may include a telephone device or system associated with a casino or other gambling establishment, or an alcohol distribution location, such as a liquor store, or beer distributor.

User devices 140 may include any device capable of accepting a speech input from a user and making the speech input available to network 120. Additionally, as described above, user devices 140 may include devices capable of interacting with service provider 110 via network 120. For example, user device 140 may include a plain old telephone system (POTS) device, a cellular telephone, and/or a computer or PDA. User devices 140 may make data available to network 120 in analog and/or digital form.

For example, one exemplary user device 140 may include an Internet protocol (IP) telephone that makes a data unit, such as a packet, available to network 120. "Data unit," as used herein, may refer to any type of machine-readable data having substantially any format that may be adapted for use in one or more networks, such as network 120. A data unit may include packet data and/or non-packet data.

Network 120 may include one or more networks capable of transferring data and/or speech in analog and/or digital formats. Implementations of network 120 may include networks designed primarily for speech data, such as PSTNs. In addition, network 120 may include data unit based networks, such as local area networks (LANs), metropolitan area networks (MANs) and/or wide area networks (WANs), such as the Internet, that may operate using substantially any network protocol, such as Internet protocol (IP), asynchronous transfer mode (ATM), and/or synchronous optical network (SONET).

Network 120 may include network devices, such as voice gateways, routers, switches, firewalls, and/or servers (not shown). Network 120 may be a hardwired network using wired conductors and/or optical fibers and/or may be a wireless network using free-space optical and/or radio frequency (RF) transmission paths. Implementations of networks and/or devices described herein are not limited to any particular data format, type, and/or protocol.

Age verification server 130 may include any device or devices configured to process speech data received via network 120 and generate an age verification score indicating a likely age of a user associated with a user device 140. In one implementation, age verification server 130 may include a dialog processing engine 135 configured to place an outbound call to the user via network 120, provide a predetermined query, receive a voice response from the user, and perform voice recognition on the received voice response. In one implementation consistent with aspects described herein, dialog processing engine 135 may be tuned to recognize adult voices. Dialog processing engine 135 may generate a confidence score associated with the recognized speech.

Dialog processing engine 135 may place outbound calls alone or in cooperation with age verification server 130. For example, dialog processing engine 135 may be configured to cause age verification server 130 to place outbound calls to user devices 140. Age verification server 130 may generate an age verification score based on the confidence score and additional factors, such as correctness of the response, and response time for providing the response. Age verification server 130 may forward the age verification score to service provider 110 for a final determination on age validity.

Implementations may include substantially any number of age verification servers 130 and/or dialog processing engines 135 operating alone or in concert. Implementations may further include one or more age verification servers 130 residing in a single network and/or domain and/or spread across multiple networks and/or domains. The functionality of age verification server 130 may be implemented in other devices, such as a desktop computer, laptop, or network device, such as a router, gateway or switch. In one implementation, the processing associated with dialog processing engine 135 may be performed by user device 140. Resulting processing responses from user device 140 may be relayed to age verification server 130 for subsequent processing, as will be described in detail below.

Figure 2:
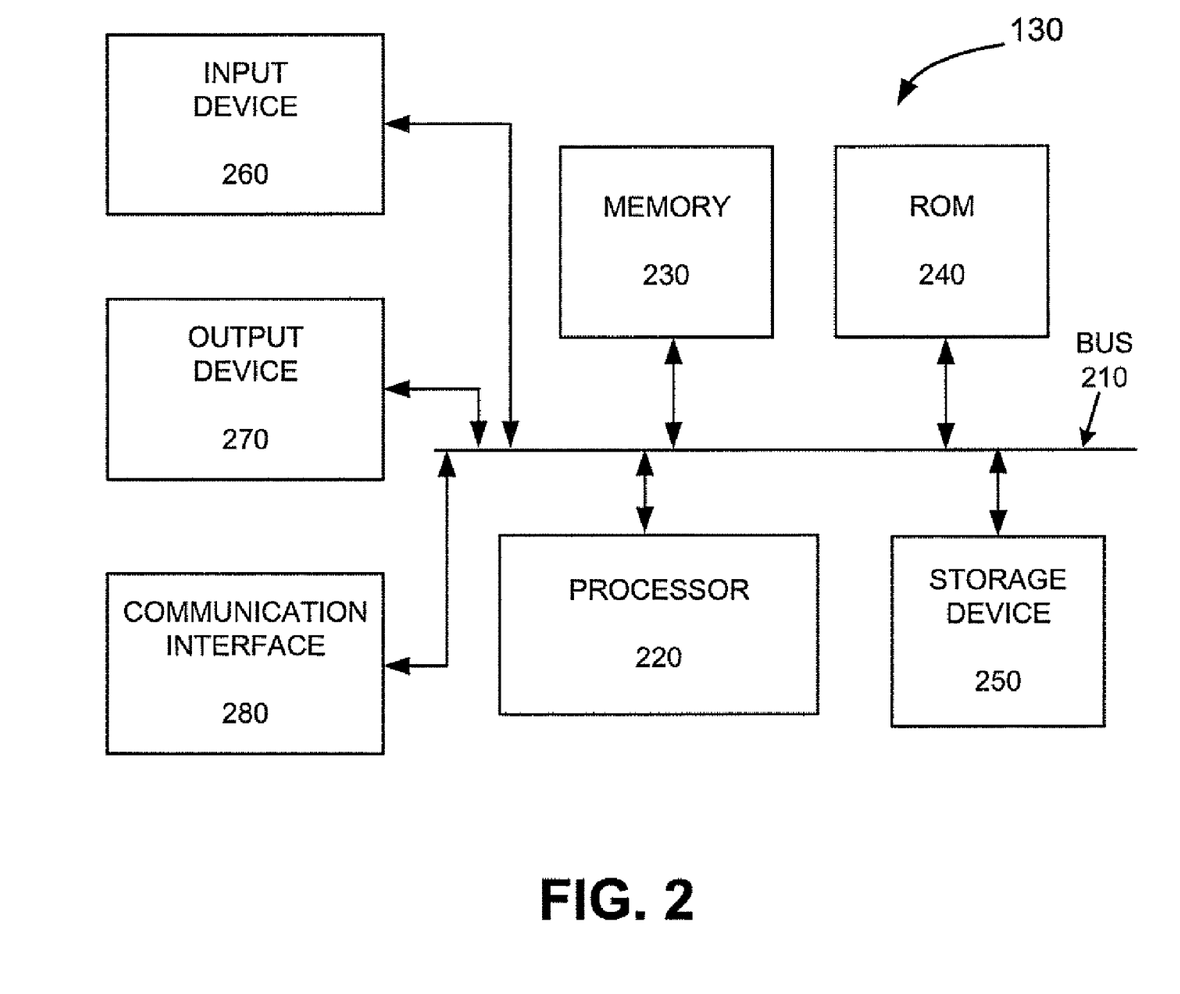
FIG. 2 illustrates an exemplary architecture for implementing the age verification server of FIG. 1.

FIG. 2 illustrates an exemplary architecture for implementing age verification server 130 consistent with embodiments described herein. It will be appreciated that service provider 110, user device 140, and/or other devices (not shown) that can be used in system 100 may be similarly configured. As illustrated in FIG. 2, age verification server 130 may include bus 210, processor 220, memory 230, read only memory (ROM) 240, storage device 250, input device 260, output device 270, and communication interface 280.

Bus 210 may include one or more interconnects that permit communication among the components of server 130.

Processor 220 may include any type of processor, microprocessor, or processing logic that may interpret and execute instructions. Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a ROM device and/or another type of static storage device that may store static information and instructions for processor 220. Storage device 250 may include a magnetic disk and/or optical disk and its corresponding drive for storing information and/or instructions.

Input device 260 may include any mechanism or combination of mechanisms that permit server 130 to accept information from an operator, such as a system administrator, via devices, such as a keyboard, a mouse, a microphone, a pen-based pointing device, and/or a biometric input device, such as a voice recognition device and/or a finger print scanning device. Output device 270 may include any mechanism or combination of mechanisms that outputs information to the operator, including a display, a printer, a speaker, etc.

Communication interface 280 may include any transceiver-like mechanism that enables server 130 to communicate with other devices and/or systems, such as service provider 110 or user device 140. For example, communication interface 280 may include a modem, an Ethernet interface, and/or a port. Alternatively, communication interface 280 may include other mechanisms for communicating via a network, such as network 120.

Server 130 may perform certain functions in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with the principles described herein. Thus, implementations described herein are not limited to any specific combination of hardware circuitry and software.

Figure 3:
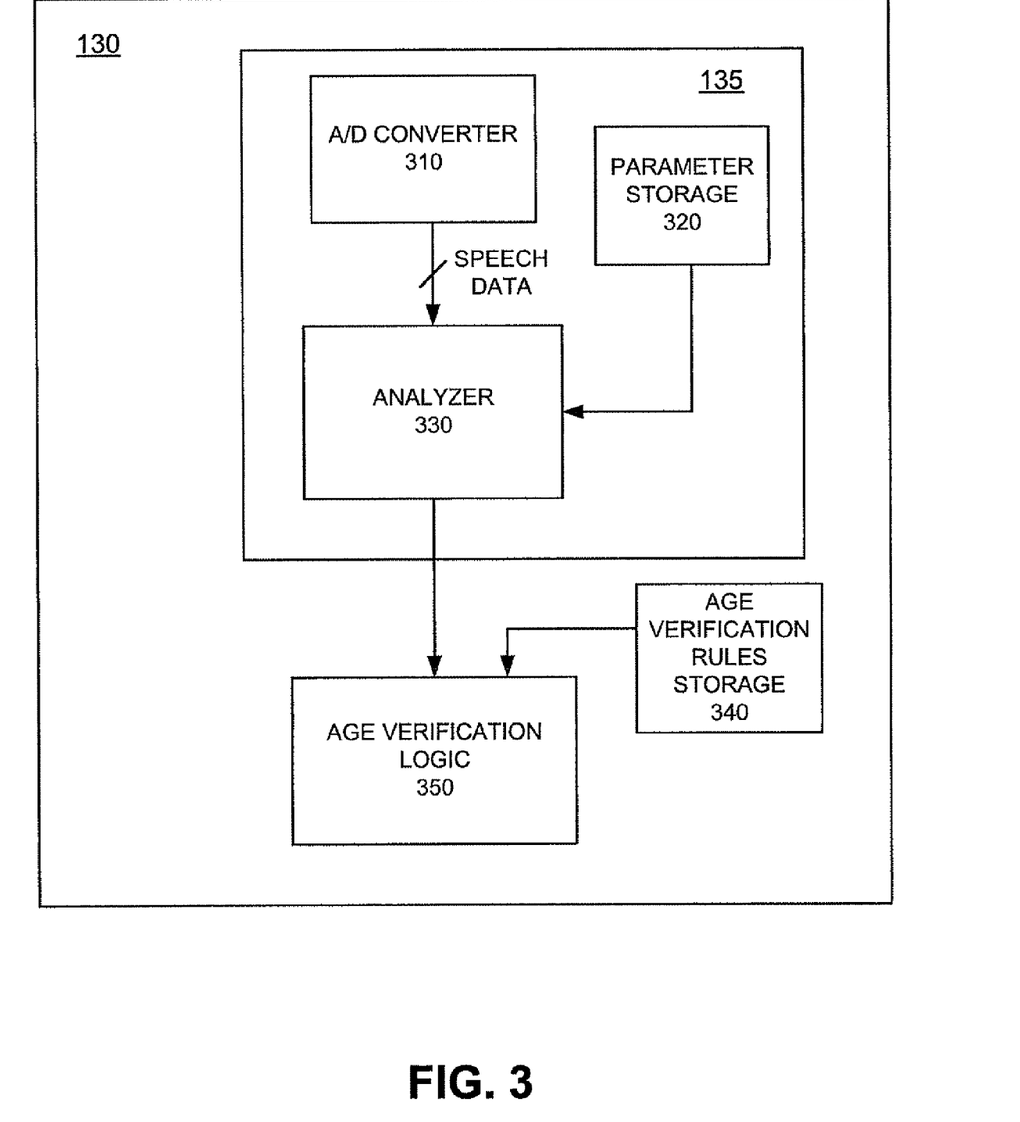
FIG. 3 illustrates an exemplary functional diagram of an age verification server and a dialog processing engine implemented via the server architecture of FIG. 2.

FIG. 3 illustrates an exemplary functional diagram of an age verification server 130 and dialog processing engine 135 implemented via the server architecture of FIG. 2. In alternative implementations, some or all of the components illustrated in FIG. 3 may be implemented in other devices or combinations of devices, such as service provider 110, user devices 140, and/or other network devices. Referring to FIG. 3, dialog processing engine 135 may include analog-to-digital (A/D) converter 310, parameter storage 320, and analyzer 330.

A/D converter 310 may include a device for converting analog speech data into a digital format. For example, A/D converter 310 may be implemented as part of input device 260 and may be configured to accept analog voice data via a network, such as the PSTN and the Internet. A/D converter 310 may digitize the analog speech data to produce a series of bits that can be formatted to operate with analyzer 330. In one implementation, A/D converter 310 may be configured to receive digitized speech data from, for example, an IP network, and may pass digitized speech data to other components illustrated in FIG. 3.

Parameter storage 320 may include a device configured to store parameters that are useful for recognizing words or phrases within received speech samples to generate recognized text and a confidence score associated with the recognized text. Parameter storage 320 may include grammars, scaling values, conversion units, weighting values, etc. that facilitate the recognition of the received speech data. For example, parameter storage 320 may store a grammar that may be used by analyzer 330 to identify words that may be spoken, patterns in which spoken words may appear, and/or a spoken language associated with spoken words. Parameter storage 320 may be implemented as part of memory 230 and/or storage device 250 consistent with the embodiments described herein.

Analyzer 330 may include a device configured to operate on the received speech data and/or the parameters of parameter storage 320 to produce an output representative of the correctness of the recognized speech relative to a query presented to the user, a response time associated with the received speech data, as well as a confidence score associated with the recognized speech. Analyzer 330 may be implemented via processor 220. Dialog processing techniques employed by analyzer 330 may use processing algorithms in combination with the stored parameters to recognize words, sounds, and/or phrases received by analyzer 330.

Analyzer 330 may employ speech recognition techniques to evaluate characteristics of a spoken phrase, such as a speaking rate for the caller, a number of pauses in the spoken phrase, the length of pauses in the spoken phrase, misarticulation of a portion of the spoken phrase, nonfluency of a portion of the spoken phrase, frequency variability of the caller's voice when speaking a portion of the phrase, and/or a vocal intensity of the caller's voice when speaking a portion of the phrase.

In one implementation, analyzer 330 may produce a confidence score represented as a percentage from 0 to 100%, where the percentage represents a confidence level reflecting an accuracy of the speech recognition performed by analyzer 330. For example, a confidence score of 86% may indicate that analyzer 330 has determined that transcription of the spoken phrase to be highly accurate. Conversely, a confidence score of 60% may indicate that analyzer 330 has determined that the transcription of the spoken phrase is less accurate.

Age verification server 130 may include age verification rules storage 340 and age verification logic 350, as illustrated in FIG. 3. Age verification rules storage 340 may include a device configured to store rules that are useful in calculating an age verification score based on output from analyzer 330. Age verification rules storage 340 may include scaling values, conversion units, weighting values, etc. that facilitate age verification based on the recognized text and the confidence score output by analyzer 330.

In one exemplary implementation, age verification rules storage 340 may include a 20% weighting assigned to the confidence score, a 40% weighting assigned to a response time, and a 40% weighting assigned to answer correctness. Age verification rules storage 340 may further include algorithms or calculations used by age verification logic 350 in calculating each age verification score component.

For example, age verification rules storage 340 may include statistical values corresponding to average adult confidence scores and expected response times for a number of possible queries. Age verification rules storage 340 may further include algorithms for generating a partial score associated with the confidence score and the response time, based on an actual confidence score and response time received from analyzer 330. In one exemplary implementation, a confidence score component of the age verification score may be determined using the calculation:

Age Verification Score$_{Conf}$=(actual conf. score/average conf. score)×100×$W_C$, where $W_C$ is a weighting value associated with the confidence portion of the age verification score. In one implementation $W_C$ may be 0.2, relating to a 20% weighting assigned to the confidence portion of the age verification score.

In another exemplary implementation, a response time component of the age verification score may be determined using the calculation:

Age Verification Score$_{time}$=[(actual resp. time−expected resp. time)/expected resp. time]×100×$W_t$, where $W_t$ is a weighting value associated with the response time portion of the age verification score. In one implementation $W_t$ may be 0.4, relating to a 40% weighting assigned to the response time portion of the age verification score.

In another exemplary implementation, an answer correctness component of the age verification score may be determined using the calculation:

Age Verification Score$_{answer}$(correct)=100×$W_a$, or

Age Verification Score$_{answer}$(incorrect)=50×$W_a$, where $W_a$ is a weighting value associated with the answer correctness portion of the age verification score. In one implementation $W_a$ may be 0.4, relating to a 40% weighting assigned to the answer correctness portion of the age verification score.

Age verification rules storage 340 may be implemented as part of memory 230 and/or storage device 250 consistent with the embodiments described herein.

Age verification logic 350 may include a device configured to produce an age verification score based on the output of analyzer 330 and age verification rules stored in age verification rules storage 340. Age verification logic 350 and age verification rules storage 340 may be incorporated into analyzer 330 or may be implemented separately.

Age verification logic 350 may accept the confidence score, the response time, and an answer correctness indication from analyzer 330, and may operate on the received information in a manner defined by the age verification rules in rules storage 340 to produce an age verification score. Alternatively, age verification logic 350 may receive the confidence score and the response time from analyzer 330 and may perform the answer correctness determination. Age verification logic 350 may utilize processor 220 and/or storage device 250 and may make a resulting age verification score available to communication interface 280. Age verification server 130 may also include a memory device to store the generated results.

In an alternative implementation, age verification storage 340 may include rules for determining the truthfulness of speech data received by age verification server 130. In such an implementation, age verification logic 350 may utilize such as truthfulness or lie detection determination in addition to or in place of the confidence score or other factors used to generate the age verification score described above.

Figure 4A:
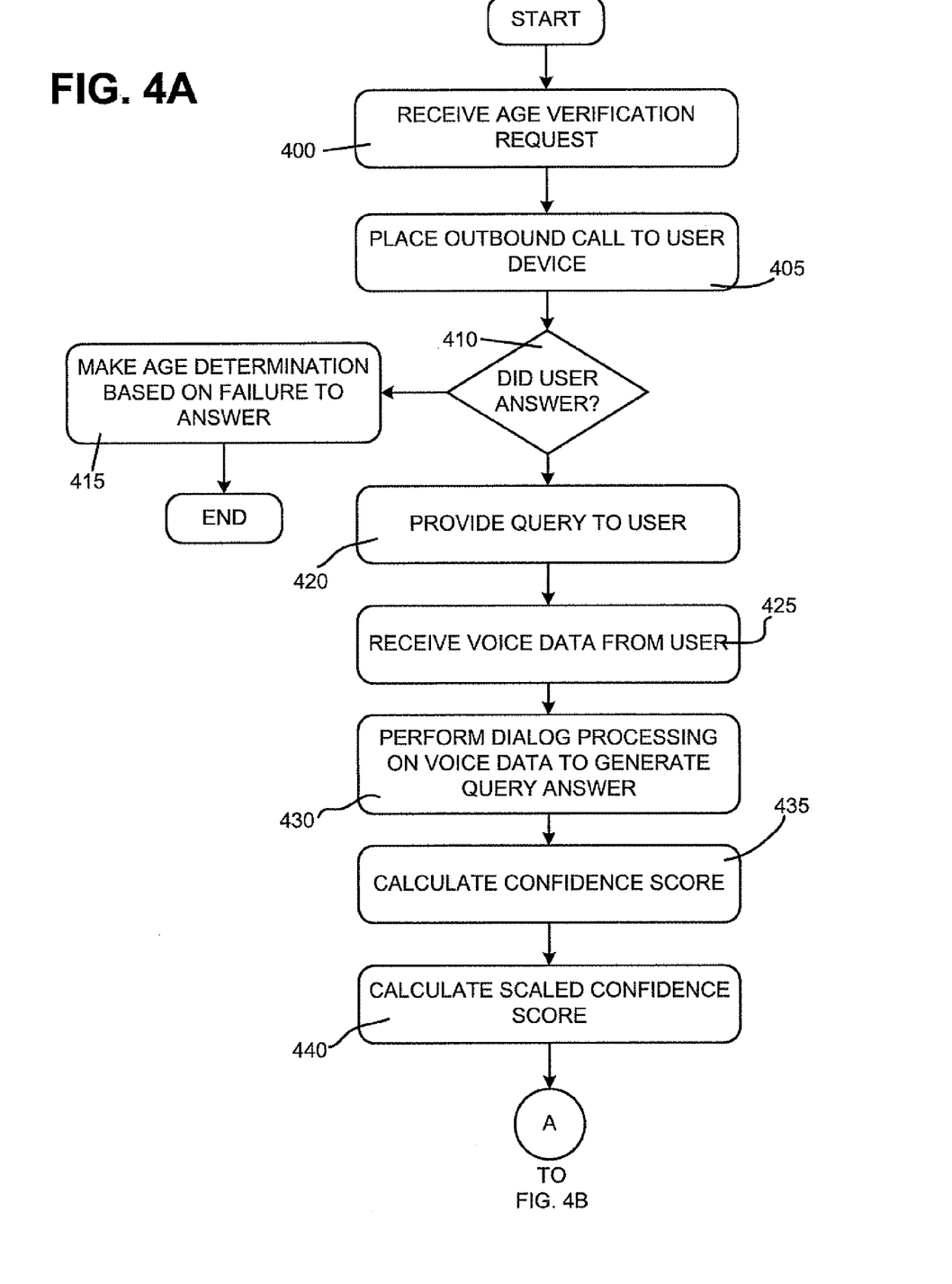
FIGS. 4A and 4B are flow charts of an exemplary process for performing age verification in an exemplary implementation consistent with embodiments described herein.
Figure 4B:
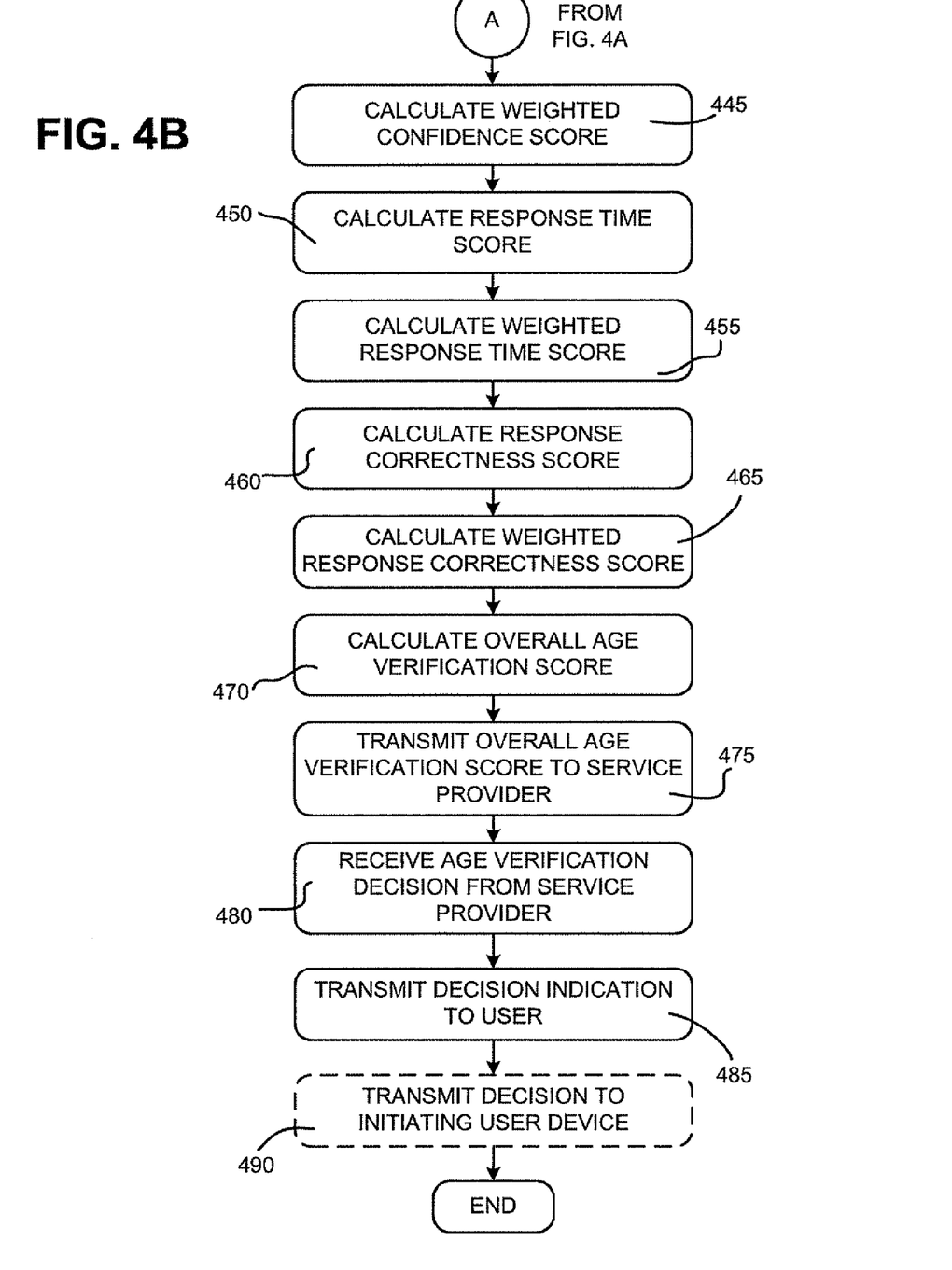

FIGS. 4A and 4B are flow charts of an exemplary process for performing age verification in an exemplary implementation consistent with embodiments described herein. The processing of FIGS. 4A and 4B may be performed by one or more software and/or hardware components within age verification server 130 and/or service provider 110. In another implementation, some or all of the processing may be performed by one or more software and/or hardware components within another device or a group of devices separate from or including age verification server 130 and/or service provider 110.

Processing may begin with server 130 receiving a request for an age verification determination from service provider 110 (block 400, FIG. 4A). As described above, service provider 110 may include such entities as a web server, a POS establishment, or a telephony server (e.g., for providing age-restricted telephony services, such as 1-900 services, tele-voting, etc.). In one implementation, service provider 110 may include a web server configured to receive a registration request from a user associated with a voice-capable user device 140 (such as a telephone device, or a voice over internet protocol (VOIP) device). The received registration request may include the address or number (i.e., phone number) associated with the user's voice-capable user device 140. The age verification request may include the received address or number.

Age verification server 130 may initiate an outbound call to the user device 140 based on the received address or number (block 405). In one implementation, the outbound call may be initiated by an IVR system associated with age verification server 130. As is known, IVR systems use speech-to-text and text-to-speech technology to communicate with users. It may be determined whether the user associated with user device 140 has answered the outbound call (block 410). If not, age verification server 130 may make an age determination based on the failure to answer (block 415). For example, age verification server 130 may determine that the user is a child if no answer is obtained.

If the user answers the outbound call to user device 140, age verification server 130 may provide a query to the user (block 420). In one exemplary implementation, the provided query may request information more likely to be known by a user within a known age group. For example, a query such as "What former president stated 'I am not a crook?'" may be more likely to be known by an adult rather than a child. Accordingly, a correctness and/or time associated with a received response may be indicative of the age of the user. In another exemplary implementation, the provided query may request that the user repeat or provide a phonetically challenging phrase. For example, a correct response to a query may be "Sid the Sloth." Receipt of this response from a child may result in a lower confidence score that a similar response received from an adult.

Age verification server 130 may receive voice data from the user in response to the provided query (block 425). In one implementation, the received voice data may be received from user device 140 via network 120. Associated with the received voice data may be a response time indicating the time taken for the caller to provide the voice data in response to the provided query. Age verification server may perform speech recognition on the received response to identify a query answer (block 430). In one exemplary implementation, analyzer 330 of dialog processing engine 135 may perform speech recognition in accordance with rules or grammars stored in parameter storage 320 to identify the query answer.

As described above, parameter storage 320 may store a number of rules or grammars associated with performing speech recognition. For example, a grammar may define a particular rule with respect to performing speech recognition. In one implementation, the grammars stored in parameter storage 320 may be customized based on constraints associated with the subject of the speech recognition process. In particular, the grammars and rules stored in parameter storage 320 may be tuned to increase a likelihood of recognition of an adult caller.

A confidence score associated with the performed speech recognition may be calculated (block 435). As described above, the confidence score associated with the received voice data may be reflective of the likelihood that the recognized speech has been accurately identified. For example, a response having a confidence score of 65 is less likely to be accurate than a response having a confidence score of 85. A scaled confidence score may be generated by dividing the calculated confidence score by an average adult confidence score (block 440). The average adult confidence score may be based on historical accuracy determinations on a population.

A weighted confidence score may be calculated based on the scaled confidence score and a weighting factor associated with a confidence score portion of an overall age verification score (block 445, FIG. 4B). In one implementation, the weighting factor associated with a confidence score portion may be 0.2 indicating that the confidence score portion accounts for 20% of the overall age verification score.

A response time score may be calculated based on the response time associated with the received voice data and the expected response time associated with the provided query (block 450). A faster response time may be associated with first age group (i.e., an adult age group), while a slower response time may be associated with a second age group (i.e., a child age group). In one implementation, the calculated response time score may be calculated by dividing the difference between the expected response time and the received response time by the expected response time.

A weighted response time score may be calculated based on the calculated response time score and a weighting factor associated with a response time score portion of the overall age verification score (block 455). In one implementation, the weighting factor associated with a response time score portion may be 0.4 indicating that the response time score portion accounts for 40% of the overall age verification score.

A response correctness score may be calculated based on the correctness of the identified query answer (block 460). In one implementation, a correct identified response may be assigned a raw score of 100, while an incorrect identified response may be assigned a raw score of 50.

A weighted response correctness score may be calculated based on the calculated raw response correctness score and a weighting factor associated with a response correctness score portion of the overall age verification score (block 465). In one implementation, the weighting factor associated with a response correctness score portion may be 0.4 indicating that the response correctness score portion accounts for 40% of the overall age verification score.

The overall age verification score may be generated based on the weighted confidence score portion, the weighted response time portion, and the weighted response correctness portion (block 470). TABLE 1 illustrates data used to generate several exemplary overall age verification scores.

TABLE 1

|  | Example 1 | Example 2 | Example 3 | Example 4 |
| --- | --- | --- | --- | --- |
| Average Confidence Score | 86 | 86 | 86 | 86 |
| Actual Confidence Score | 60 | 87 | 65 | 90 |
| Scaled Confidence Score | 69.77 | 101.16 | 75.58 | 104.65 |
| Weighted Confidence Score | 13.95 | 20.23 | 15.12 | 20.93 |
| Expected Response Time | 5 | 4 | 5 | 5 |
| Received Response Time | 6 | 2 | 3 | 4.5 |
| Scaled Response Time | −20 | 50 | 40 | 10 |
| Weighted Response Time Score | −8 | 20 | 16 | 4 |
| Response Correctness Score | 50 | 100 | 50 | 100 |
| Weighted Resp. Correctness Score | 20 | 40 | 20 | 40 |
| Overall Age Verification Score | 25.95 | 80.23 | 51.12 | 64.93 |

The overall age verification score may be transmitted or provided to service provider 110 to assist the service provider in making a decision regarding a likely age or age group of the user (block 475). In one implementation, the age verification score may be transmitted to service provider 110 via network 120. In an alternative implementation, service provider 110 may allow age verification server 130 to make the age determining on its behalf. Using the examples of TABLE 1, it may be determined that the caller in Example 1 is a child, the caller in Example 2 is an adult, and the callers in Examples 3 and 4 may be either children or adults and may required additional screening and/or processing.

For example, in one embodiment, an overall age verification score less than approximately 50 may be associated with a child caller; an overall age verification score between approximately 50 and 74 may be associated with either a child caller or an adult caller and additional processing and/or handling may be required; and an overall age verification score greater than 74 may be associated with an adult caller. These ranges are provided for exemplary purposes only and service provider 130 may correspond associated age verification scores with age verification decisions based on a multitude of factors, such as the type of service being provided, etc.

Age verification server 130 may receive an age verification decision from service provider 130 (block 480). In response to the received decision from service provider 110, age verification server 130 may transmit an indication reflecting the received age verification decision to user device 140 via network 120 (block 485). Optionally, in an implementation initiated by a network-accessible user device 140 (such as a web-accessible personal computer or mobile phone), age verification server 130 may transmit a corresponding age verification decision to network-accessible user device 140. For example, age verification server 130 may transmit a "registration failed" message to the initiating user device 140.

Figure 5:
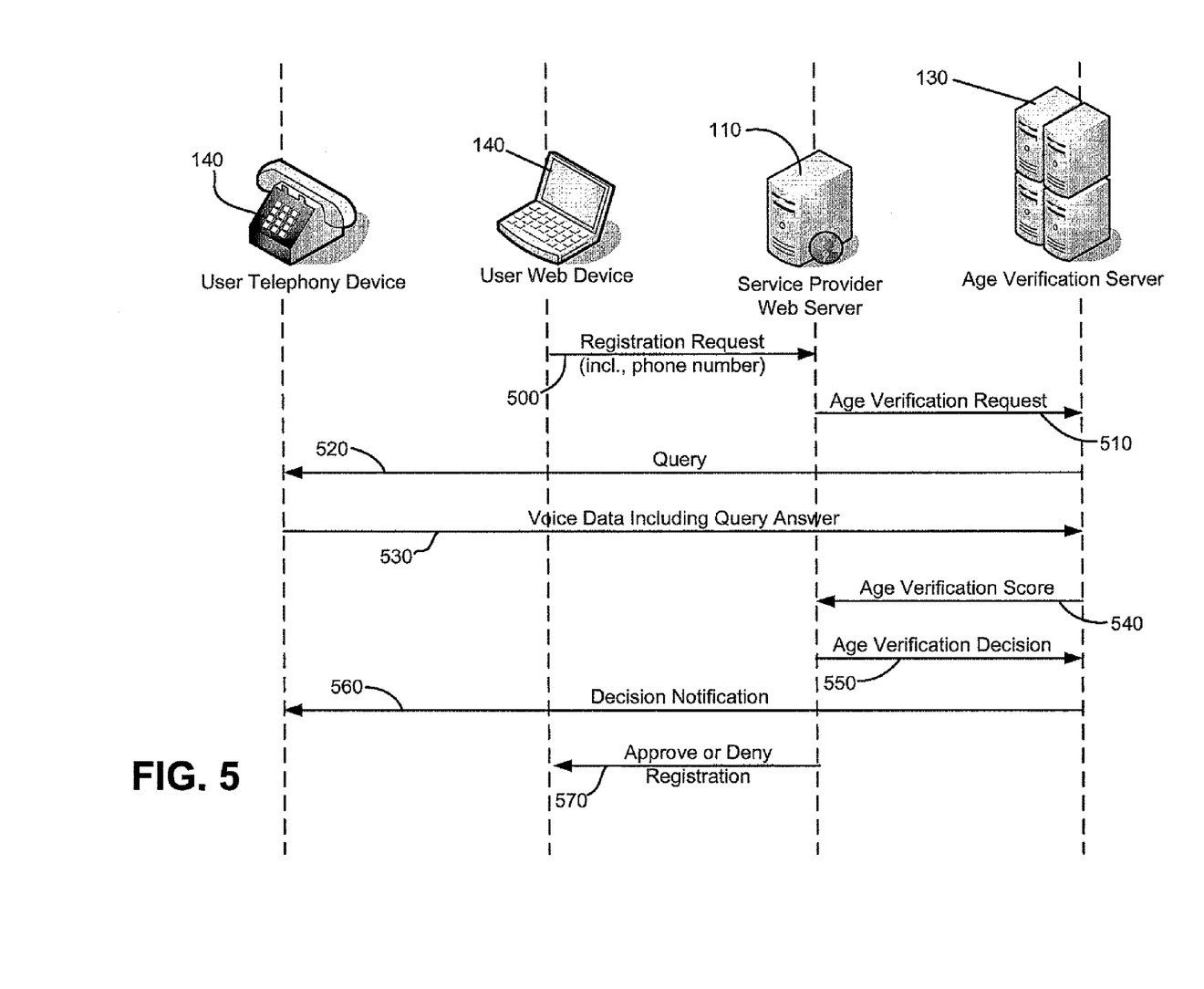
FIG. 5 is a service flow diagram illustrating one exemplary flow of interactions between user devices, a service provider, and an age verification server of FIG. 1.

FIG. 5 is a service flow diagram illustrating one exemplary flow of interactions between a user of user device(s) 140, a service provider 110, and an age verification server 130. Initially, a registration request from a first user device 140 may be received by a service provider web server 110 (interaction 500). This request may include user information and should include at least a telephone number or VOIP address for receiving a telephony call relating to the registration request. Next, an age verification request may be transmitted from service provider web server 110 to age verification server 130 (interaction 510). As noted above, this request should include at least the telephone number or VOIP address provided in the received registration request.

Age verification server 130 may make an outbound call to user telephony device 140, the call including at least a query useful in making an age verification decision (interaction 520). Age verification server 130 may receive a voice response from user telephony device 140 (interaction 530) and may perform speech recognition thereon.

As described above, age verification server 130, based on stored rules and parameters, may calculate an age verification score associated with the user. Age verification server 130 may transmit the calculated age verification score to service provider web server 110 (interaction 540). As described above, service provider web server 110 may use the received age verification score to make a determination regarding whether to allow access or registration to the user. Age verification server 130 may receive the age verification determination from service provider web server 110 (interaction 550) and may notify the user of the decision (interaction 560). Optionally, service provider web server 110 may grant or deny the registration request based on the age verification determination and may notify the user at user web device 140 (interaction 570).

Implementations described herein may allow for automated age verification based on vocal characteristics of a user. The implementations may provide a query to a user and may receive voice data including a query answer. Speech recognition may be performed on the voice data to identify the query answer and may generate a confidence score relating to the query answer. The confidence score, alone, or in combination with other factors, such as a response time and a correctness of the query answer, may be used to generate an age verification score. The age verification score may be used to grant or deny access to requested content or services.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, implementations consistent with the principles of the invention can be implemented using devices and configurations other than those illustrated in the figures and described in the specification without departing from the spirit of the invention. Devices and/or components may be added and/or removed from the implementations of FIGS. 1-3 depending on specific deployments and/or applications. Further, disclosed implementations may not be limited to any specific combination of hardware, software and/or firmware. In addition, while a series of acts or interactions have been described with respect to FIGS. 4A, 4B, and 5, the order of acts may be varied in other implementations. Moreover, non-dependent acts may be implemented in parallel.

Details of algorithms and/or techniques for analyzing speech samples have not been provided since implementations consistent with the embodiments described herein may use substantially any such algorithms and/or techniques and/or may be customized based on particular requirements associated with an implementation of the invention.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A device, comprising:
one or more processors to:
provide a query to a user,
receive voice data from a user,
identify a result from the voice data,
calculate a confidence score associated with the result,
identify a response time associated with the voice data based on a time between providing the query and receiving the voice data, and
determine a likely age range associated with the user based on the confidence score and the response time.

2. The device of claim 1, wherein the one or more processors to identify a result from the voice data, comprises:
one or more processors to perform speech recognition on the voice data to generate the result.

3. The device of claim 1, wherein the confidence score comprises a scaled confidence score.

4. The device of claim 3, wherein the scaled confidence score is scaled with respect to an average confidence score.

5. The device of claim 1, wherein the confidence score comprises a weighted confidence score.

6. The device of claim 1, wherein the response time comprises a scaled response time.

7. The device of claim 6, wherein the scaled response time is scaled with respect to an expected response time.

8. The device of claim 1, wherein the response time comprises a weighted response time.

9. The device of claim 1, wherein the one or more processors are further configured to:
determine a correctness score relating to a correctness of the result with respect to a provided query; and
determine the likely age range associated with the user based on the confidence score, the response time, and the correctness score.

10. The device of claim 9, wherein the correctness score comprises a weighted correctness score.

11. The device of claim 9, wherein the at least one processor to determine a likely age range associated with the user based on the confidence score, the response time associated with the voice data, and the and the correctness score further comprises one or more processors to:
calculate a weighted confidence score based on the confidence score and a confidence weighting factor;

calculate a weighted response time score based on the identified response time, an expected response time, and a response time weighting factor;

calculate a weighted correctness score based on the correctness score and a correctness weighting factor;

calculate an age verification score based on the weighted confidence score, the weighted response time, and the weighted correctness score; and determine a likely age range associated with the user based on the age verification score.

12. The device of claim 11, wherein the confidence weighting factor is approximately 0.2, the response time weighting factor is approximately 0.4, and the correctness weighting factor is approximately 0.4.

13. The device of claim 11, wherein the weighted response time score is expressed as:

$$[(\text{actual response time} - \text{expected response time})/\text{expected response time}] \times 100 \times W_t,$$

where $W_t$ is the response time weighting factor.

14. The device of claim 1, wherein the one or more processors are further configured to:

receive a request for age verification from a service provider, the request including one of a telephone number associated with the user, or a voice over internet protocol address associated with the user.

15. The device of claim 14, wherein the service provider comprises a web server associated with an age-restricted service.

16. The device of claim 14, wherein the service provider comprises a telephony server associated with an age-restricted telephony service.

17. The device of claim 14, wherein the one or more processors are further configured to:

place an outbound call to the user based on the received request, and provide a query in the outbound call for eliciting the voice data.

18. The device of claim 17, wherein the one or more processors are further configured to:

determine whether the user answered the outbound call; and determine that the user is in a predetermined age group when it is determined that the user did not answer the outbound call.

19. The device of claim 14, wherein the one or more processors are further configured to:

transmit the likely age range associated with the user to the service provider.

20. A computing-device implemented method, comprising:

providing a query to a user;

receiving voice data responsive to the query;

identifying, by at least one processor, a response time associated with the received voice data based on a time between providing the query and receiving the voice data;

performing speech recognition on the voice data to identify a query answer;

identifying a confidence score associated with the query answer; and calculating an age verification score associated with the user based on the identified confidence score and the response time.

21. The computing-device implemented method of claim 20, wherein the voice data response to the query is indicative of an age category of the user.

22. The computing-device implemented method of claim 20, further comprising:

identifying a correctness of the query answer based on the provided query; and calculating the age verification score based on the confidence score, the response time, and the correctness of the query.

23. The computing-device implemented method of claim 20, further comprising:

determining whether the caller is an adult based on the age verification score.

24. A computer-readable memory device having stored thereon sequences of instructions which, when executed by at least one processor, cause the at least one processor to:

provide a query to a user, receive voice data from the user responsive to the query, identify a query answer from the voice data, calculate a confidence score associated with the query answer, identify a response time associated with the voice data based on a time between providing the query and receiving the voice data, determine a correctness of the query answer, and generate a score indicative of whether the user is an adult based on the response time.

* * * * *